United States Patent Office 2,768,207
Patented Oct. 23, 1956

2,768,207

UNITARY PROCESS FOR THE PRODUCTION OF 2-BENZYLPHENYL β-DIMETHYLAMINOETHYL ETHER DIHYDROGEN CITRATE

Lee C. Cheney, Fayetteville, N. Y., and Stephen B. Binkley, Wheaton, Ill., assignors to Bristol Laboratories Inc., Syracuse, N. Y., a corporation of New York No Drawing. Application February 5, 1951, Serial No. 209,520

2 Claims. (Cl. 260—570)

This application is a continuation-in-part of our co-pending applications Serial No. 760,694, filed July 12, 1947; Serial No. 37,304, filed July 6, 1948, and now abandoned; Serial No. 128,028, filed November 17, 1949 and now abandoned; and Serial No. 182,412, filed August 30, 1950, now issued as United States Patent Number 2,703,324.

This invention relates to a unit process for the preparation of beta-disubstituted-aminoethyl ortho-aralkylphenyl ethers in the form of their polycarboxylic acid addition salts. More particularly the invention comprises a one-step process for the production of compounds represented by the general formula:

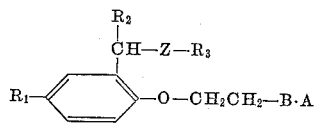

wherein $R_1$ and $R_3$ are members of the class consisting of hydrogen, lower alkyl, halogen and alkoxy; $R_2$ is a member of the class consisting of hydrogen and methyl; Z is a member of the class consisting of divalent radicals derived from benzene, thiophene, furan and pyridine; B is a member of the class consisting of lower dialkylamino, 1-pyrrolidyl, 1-piperidyl and 4-morpholinyl groups; and A is a polycarboxylic acid, including citric, malic, tartaric, succinic, maleic and fumaric acids.

The disclosed methods for the synthesis of the basic ethers of this class, including their inorganic addition salts (Journal of the American Chemical Society, 71, 60, 64, 3795 (1949)), comprise several objectionable steps. Disadvantages of the known methods include (1) the required use of the ortho-aralkylphenols in purified form, (2) the hazardous use of metal sodium, sodium hydride or sodium alkoxides, (3) the use of the free basic chlorides in place of the stable basic chloride hydrochlorides in the condensation, (4) the use of strictly anhydrous conditions for carrying out the reaction, (5) the use of the fractional distillation for purification of the basic ethers and (6) the use of inorganic acids for the preparation of salts suitable for therapeutic administration. In general the inorganic acid salts such as the hydrochloride tend to be hygroscopic and they are too soluble in hydroxylated solvents to be purified by recrystallization from water or alcohols.

We have found that pure, non-hygroscopic polycarboxylic acid salts, such as the dihydrogen citrate, of beta-disubstituted-aminoethyl 2-aralkylphenyl ethers can be cheaply and conveniently produced even from mixtures of the isomeric ortho-aralkyl and para-aralkylphenols by a unit process which comprises dissolving the aralkylphenol(s) in an inert, non-aqueous organic solvent, heating the solution with a molecular excess of an alkali metal hydroxide, removing by filtration the insoluble alkali metal para-alkylphenoxide which may be present, heating the filtrate containing essentially the more soluble alkali metal ortho-aralkylphenoxide with a beta-disubstituted-aminoethyl chloride hydrochloride and an alkali metal hydroxide or carbonate until the formation of the basic phenolic ether is completed, adding an excess of a polycarboxylic acid and water to the reaction mixture to precipitate the corresponding acid salt(s) of the basic ether(s) and to dissolve impurities and recrystallizing the precipitated salt(s) from water or an alcohol which efficiently eliminates the more soluble salt of any remaining para isomer in case a mixture of isomeric aralkylphenols is used in the process.

The unit process of the invention is particularly advantageous for the preparation of basic ethers of ortho-aralkylphenols not substituted in the para position of the phenolic ring since it is well known that a mixture of para- and ortho-aralkylphenols are formed when phenol is caused to react with an aralkyl halide. Moreover, the direct alkylation of an alkali metal phenoxide with an aralkyl halide in a non-polar solvent by the method of Claisen et al., Ann. 442, 210 (1925), to minimize para substitution generally produces unfavorably low yields of ortho-aralkyl-phenols. Not only can an isomeric mixture be used directly in the unit process of the invention but also the para-aralkylphenol can be recovered in pure form as a valuable by-product.

Akimoff, United States Patent No. 2,016,848 (1935), has shown that para-benzylphenol can be separated from ortho-benzylphenol by dissolving the mixture of isomers in an inert, non-aqueous solvent, adding an aqueous solution of an alkali metal hydroxide thereto to form the alkali metal salts, removing the water by distillation and then collecting the insoluble alkali metal para-benzylphenoxide by filtration while leaving the alkali metal ortho-benzylphenoxide in solution. We have found that this same peculiar solubility behaviour applies generally to the extent that analogous para-aralkylphenols can be readily obtained in pure form by the procedure of Akimoff. In contrast, we have also found that the Akimoff separation does not yield pure ortho-benzylphenol and analogous ortho-aralkylphenols because of the fact that considerable amounts of the para isomers remain in the filtrates.

The remaining para isomer is eliminated in the process of the invention by taking advantage of the surprising difference in the solubility of the polycarboxylic acid salts of the isomeric basic ethers in hydroxylated solvents. For example, we have found that in water at room temperature the solubility of ortho-benzylphenyl beta-dimethyl-aminoethyl ether dihydrogen citrate is less than one-twentieth as soluble as the more symmetrical isomer derived from para-benzylphenol, the solubility values being 1% and greater than 20% respectively. Consequently, recrystallization from water efficiently eliminates the contaminating para isomer and provides the pure ortho isomer in favorable yields. In every case examined the polycarboxylic acid salt of the basic ether derived from an ortho-aralkylphenol has proved to be less soluble than its para isomer in hydroxylated solvents.

This generalization is not true for the salts derived from inorganic acids, e. g. the hydrochlorides.

Because of the well known tendency for beta-disubstituted-ethyl chlorides to undergo dimerization and polymerization, particularly in the presence of polar solvents, it is surprising that favorable yields of basic ethers are obtained in the process without employing anhydrous conditions for the Williamson condensation.

Among the noteworthy advantages of the invention are the following: (1) A cheap isomeric mixture of ortho- and para-aralkylphenols can be used in the process in place of the much more costly ortho-aralkylphenols in pure form. (2) An alkali metal hydroxide can be used in place of alkali metals, or their hydrides, alkoxides and amides which require special safety precautions. (3) It is unnecessary to prepare separately the free basic chloride for the condensation. (4) Distillation of the basic ether for purification of the product is unnecessary, thus equipment requirements and labor costs are reduced to a minimum. (5) The polycarboxylic acid salts are non-hygroscopic and they are easily purified by recrystallization.

Because of the low toxicity and the desirable physical properties of the dihydrogen citrates, we prefer to use the citric acid in the invention, but other polycarboxylic acids applicable to the process include malic, tartaric, succinic, maleic and fumaric acids. The acids can be introduced in the solid state or in the form of an aqueous solution or suspension. Inert, non-aqueous solvents suitable for the process include toluene, xylene, chlorobenzene and ortho-dichlorobenzene. Although flake sodium hydroxide is preferred, alkali metals, other alkali metal hydroxides, hydrides and amides can be used in the process. It is unnecessary to remove the water formed when an alkali metal hydroxide is caused to react with the phenol. In cases where a relatively pure ortho-aralkylphenol is used in the process, particularly where a nuclear substituent in the para position of the phenolic ring precludes the possibility of the para isomer being present; all of the reactants required to form the basic ether can be added at one time to the reaction vessel.

It is apparent that modifications of the process can be devised. For example, a beta-haloethyl ortho-aralkylphenyl ether can be prepared as an intermediate which can then be caused to react with a secondary amine to form the corresponding basic ether. The latter can be then precipitated and purified by means of a polycarboxylic acid such as citric acid.

The products of the invention include powerful antihistamine agents, local anesthetics and anti-fungal agents.

The following examples serve to illustrate but not limit the invention.

EXAMPLE I

*2-benzylphenyl β-dimethylaminoethyl ether dihydrogen citrate*

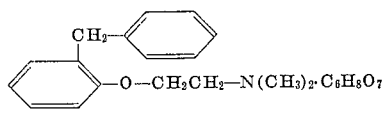

To a solution of 92.1 g. of a mixture consisting of approximately 57% ortho-benzylphenol and 43% para-benzylphenol in 350 ml. of toluene is added 25 g. of flake sodium hydroxide. The reaction mixture is stirred and heated under reflux for 1.5 hours and then filtered while hot by gentle suction through a coarse fitted glass funnel. Toluene (350 ml.) is employed to wash the relatively insoluble sodium para-benzylphenoxide on the filter. To the filtrate containing the soluble sodium ortho-benzylphenoxide and also an appreciable amount of the para isomer is added 12 g. of sodium hydroxide in the form of flakes and 43.3 g. of beta-dimethylaminoethyl chloride hydrochloride. The stirred reaction mixture is heated under reflux overnight (20 hours) and then treated with 105 g. of citric acid monohydrate dissolved in 400 ml. of water. After heating the mixture to 90–100° C. on the steam bath, the acidic aqueous layer is separated, 13.7 g. of decolorizing carbon is added thereto and the mixture is digested on the steam bath for fifteen minutes. After removal of the carbon by filtration, the hot filtrate is cooled to 5° C. The white dihydrogen citrate which crystallized, M. P. 112–125° C., is collected by suction filtration and recrystallized from 450 ml. of water for the removal of the remaining para isomer. For the complete removal of water, the damp filter cake from the second recrystallization is broken up, covered with benzene and subjected to azeotropic distillation.

Following removal of the benzene by distillation under the reduced pressure, the product is dissolved in 360 ml. of boiling methanol and the solution is filtered and then cooled in an ice-bath. The white crystalline 2-benzylphenyl β-dimethylaminoethyl ether dihydrogen citrate is collected by suction filtration and dried in the air; M. P. 139–140° C. with evolution of gas; yield, 88.5 g.

To avoid discoloration accompanying prolonged exposure to the atmosphere, the sodium para-benzylphenoxide is dissolved without delay in 300 ml. of water and the solution is acidified by the addition of 40 ml. of 20% sulfuric acid. Residual toluene is removed by conducting steam into the mixture which is then cooled and filtered, and the para-benzylphenol thus collected is washed with water and dried in air; M. P. 80.5–83.5° C.; yield, 34.5 g.

EXAMPLE II

*β-Dimethylaminoethyl 2-(2'-thenyl)-phenyl ether dihydrogen citrate*

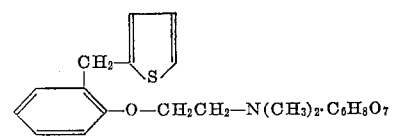

In accordance with the procedure of Example I, a mixture of ortho- and para-(2-thenyl)-phenol in place of the mixture of ortho- and para-benzylphenol is converted into β-dimethylaminoethyl 2-(2'-thenyl)-phenyl ether dihydrogen citrate; M. P. 150–151° C. (with decomposition).

EXAMPLE III

*2-β-dimethylaminoethyl 2-furfurylphenyl ether dihydrogen citrate*

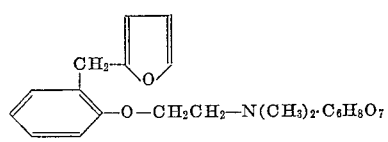

In the manner described in Example I, by using o-furfurylphenol and an equimolecular amount of β-dimethylaminoethyl chloride hydrochloride, there is obtained 2-β-dimethyl aminoethyl 2-furfurylphenyl ether dihydrogen citrate as a white crystalline solid.

EXAMPLE IV

*2-benzylphenyl β-dimethylaminoethyl ether acid DL-malate*

In the manner described in Example I, by using an equivalent molecular quantity of DL-malic acid (67 g.) in place of citric acid and approximately one-half as much water, there is obtained the above identified salt; M. P. 129.5–131° C.

EXAMPLE V

*2 - benzylphenyl β - diethylaminoethyl ether dihydrogen citrate*

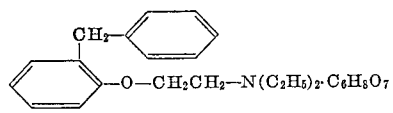

In the manner described in Example I, by using an equivalent molecular quantity of β - diethylaminoethyl chloride hydrochloride in place of β-dimethylaminoethyl chloride hydrochloride there is obtained 2-benzylphenyl β-diethylaminoethyl ether dihydrogen citrate; M. P. 127.5–128.5° C.

EXAMPLE VI

*2 - benzylphenyl β - (1 - pyrrolidyl) - ethyl ether dihydrogen citrate*

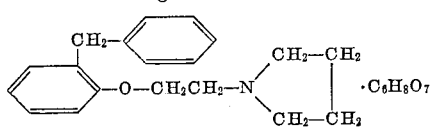

In the manner described in Example I, by using an equivalent molecular amount of β-(1-pyrrolidyl)-ethyl chloride hydrochloride in place of β-dimethylaminoethyl chloride hydrochloride there is obtained 2-benzylphenyl β-(1-pyrrolidyl)-ethyl ether dihydrogen citrate; M. P. 135–136° C. with decomposition.

EXAMPLE VII

2 - benzylphenyl β - (1 - piperidyl) - ethyl ether dihydrogen citrate

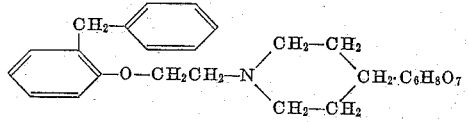

By following the procedure of Example I, using an equivalent molecular quantity of β - (1 - piperidyl) - ethyl chloride hydrochloride in place of the dimethylamino analog, there is obtained 2-benzylphenyl β-(1-piperidyl)-ethyl ether dihydrogen citrate; M. P. 145.5–146° C. with decomposition.

EXAMPLE VIII

2 - benzylphenyl β - (4 - morpholinyl) - ethyl ether dihydrogen citrate

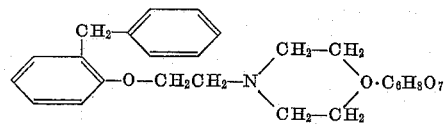

By following the procedure of Example I, using an equivalent molecular quantity of β-(4-morpholinyl)-ethyl chloride hydrochloride in place of the dimethylamino analog, there is obtained 2-benzylphenyl β-(4-morpholinyl)-ethyl ether dihydrogen citrate; M. P. 125–126° C. with decomposition.

EXAMPLE IX

2 - benzylphenyl β - dimethylaminoethyl ether acid D-tartrate

By following the procedure of Example I, using a molecular equivalent of D-tartaric acid dissolved in an equal weight of water in place of the solution of citric acid, there is obtained the acid tartrate, which melts at 121.5–123° C. after recrystallization from n-propanol.

EXAMPLE X 2-benzylphenyl β-dimethylaminoethyl ether acid succinate

The base is prepared in accordance with the procedure of Example I. In place of the aqueous solution of citric acid, there is added 59 g. of succinic acid dissolved in a minimum of boiling water. The mixture is cooled; the precipitated acid succinate is collected by filtration, dried and recrystallized from isopropanol; M. P. 104–105° C.

EXAMPLE XI 2-benzylphenyl β-dimethylaminoethyl ether acid maleate

To a hot solution of the basic ether prepared in accordance with the procedure of Example I, there is added 58 g. of maleic acid dissolved in and equal weight of water. The precipitated acid maleate is filtered from the cooled solution and recrystallized from water or isopropanol; M. P. 118–119° C.

EXAMPLE XII 2-benzylphenyl β-dimethylaminoethyl ether acid fumarate

To a xylene solution of the basic ether prepared as described in Example I, except xylene is used in place of toluene as the reaction medium, there is added 60 g. of pulverized fumaric acid and 100 ml. of water. The stirred mixture is warmed on the steam bath for fifteen minutes, then cooled and filtered to obtain the acid fumarate which melts at 144–145° C. after recrystallization from water or isopropanol.

EXAMPLE XIII 2-benzyl-4-chlorophenyl β-dimethylaminoethyl ether dihydrogen citrate

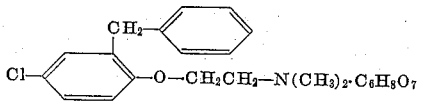

A mixture of 109 g. of o-benzyl-p-chlorophenol, 300 ml. of toluene, 86.5 g. of β-dimethylaminoethyl chloride hydrochloride and 50 g. of flake sodium hydroxide is stirred and heated under reflux for about seventeen hours. A solution of 150 g. of citric acid (anhydrous) in 500 ml. of water is then added to the reaction mixture containing the basic ether and the mixture is heated to 95–100° C. The toluene layer is separated and discarded. After chilling the aqueous layer, the precipitated solid is collected by filtration. Recrystallization from a minimum amount of water, following treatment with 7.5 g. of decolorizing carbon, yields 193 g. of colorless crystals; M. P. 143–144° C.

EXAMPLE XIV 2-benzyl-4-ethoxyphenyl β-diethylaminoethyl ether dihydrogen citrate

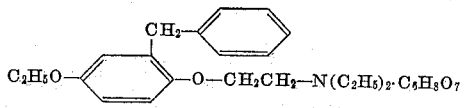

By following the procedure of Example 13, using equivalent molecular quantities of o-benzyl-p-ethoxyphenol and β-diethylaminoethyl chloride hydrochloride, the above identified compound is obtained as a white crystalline solid.

EXAMPLE XV

β-Diethylaminoethyl 2-(α-methylbenzyl)-phenyl ether dihydrogen citrate

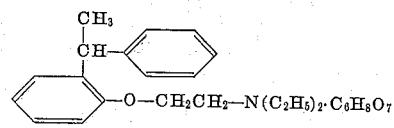

By following the method described in Example I, there is obtained from o-(α-methylbenzyl)-phenol and β-diethylaminoethyl chloride hydrochloride the above identified dihydrogen citrate; M. P. 126–129° C.

EXAMPLE XVI

β-Diethylaminoethyl 4-methyl-2-(α-methylbenzyl)-phenyl ether dihydrogen citrate

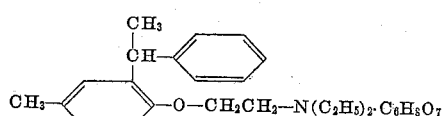

By following the procedure of Example 13, using p-methyl-o-(α-methylbenzyl)-phenol and β-diethylaminoethyl chloride hydrochloride in place of o-benzyl-p-chlorophenol and β-diethylaminoethyl chloride hydrochloride, respectively, there is obtained the above identified compound as a white crystalline solid; M. P. 125–128° C.

EXAMPLE XVII

β-Dimethylaminoethyl 2-(2'-pyridylmethyl)-phenyl ether dihydrogen citrate

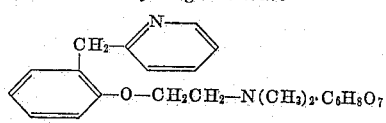

By following the procedure of Example 13, using 92.5 g. of o-(2-pyridylmethyl)-phenol in place of o-benzyl-p-chlorophenol and 150 ml. instead of 500 ml. of water with the citric acid, there is obtained the above dihydrogen citrate; M. P. 149–150° C. with evolution of gas.

EXAMPLE XVIII 2-(4'-bromobenzyl)-phenyl β-dimethylaminoethyl ether acid malate

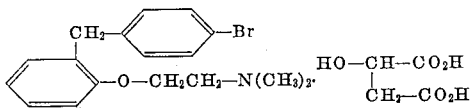

By following the procedure of Example 13, using 0.5 mole of o-(4'-bromobenzyl)-phenol in place of o-benzyl-p-chlorophenol, and 0.75 mole of malic acid dissolved in an equal weight of water instead of the aqueous citric acid there is obtained the pictured acid malate as a crystalline solid.

EXAMPLE XIX

β-Diethylaminoethyl 2-(4'-isopropylbenzyl)-phenyl ether dihydrogen citrate

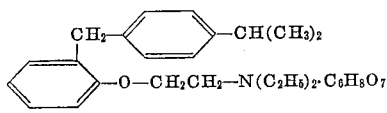

By following the procedure of Example 13, using o-(4'-isopropylbenzyl)-phenol instead of o-benzyl-p-chlorophenol and 0.5 mole of β-diethylaminoethyl chloride hydrochloride instead of β-dimethylaminoethyl chloride hydrochloride, there is obtained the above dihydrogen citrate as a crystalline solid.

EXAMPLE XX

β-Dimethylaminoethyl 2-(4'-methoxybenzyl)-phenyl ether acid maleate

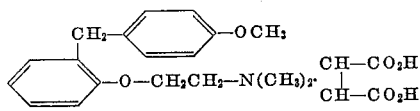

By following the procedure of Example 13, using o-(4'-methoxybenzyl)-phenol in place of o-benzyl-p-chlorophenol and 90 g. of maleic acid dissolved in 100 ml. of water there is obtained the pictured acid maleate as a crystalline solid.

EXAMPLE XXI

β-Dimethylaminoethyl 2-(3'-thenyl)-phenyl ether dihydrogen citrate

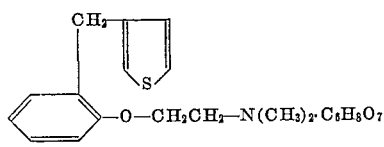

In the manner described in Example 13, by using o-(3'-thenyl)-phenol (which may be prepared by reacting 3-thenyl bromide with sodium phenoxide suspended in toluene) in place of o-benzyl-p-chloro-phenol, there is obtained the pictured dihydrogen citrate which melts at 136–137.5° C. after recrystallization from methanol-ether.

EXAMPLE XXII 2-benzylphenyl β-dimethylaminoethyl ether dihydrogen citrate

To the toluene filtrate containing predominantly sodium o-benzyl-phenoxide and an appreciable amount of sodium p-benzylphenoxide, prepared in accordance with the procedure of Example I, there are added 400 ml. of ethylene dichloride and 12 g. of flake sodium hydroxide. The stirred reaction mixture is heated under reflux overnight. Solvent and excess ethylene dichloride are then removed by distillation under reduced pressure. The residue is dissolved in 700 ml. of toluene, the solution is placed in a bomb cooled to 10° C. and gaseous dimethylamine is passed into the solution until about 68 g. has been added. The sealed bomb is heated for seven hours at 150° C., then cooled, opened and the contents are washed thoroughly with water for the removal of dimethylamine and its hydrochloride. The stirred toluene solution is then treated with a 25% aqueous solution of citric acid until precipitation is complete. The dihydrogen citrate is collected by suction filtration and recrystallized from water, which effectively eliminates the more soluble para isomer to yield 2-benzylphenyl β-dimethylaminoethyl ether dihydrogen citrate; M. P. 139–140° C.

EXAMPLE XXIII 4-chloro-2-benzylphenyl β-dimbethylaminoethyl ether dihydrogen citrate

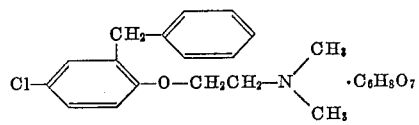

To a well-stirred solution of 218 g. (1.0 mole) of 4-chloro-2-benzylphenol in 750 ml. of toluene is added all at once 46 grams (1.15 moles) of flake sodium hydroxide. The reaction mixture is refluxed until no more water can be removed by means of a Dean-Stark trap. About 1.75 hours are required. A solution of 60 grams (1.5 moles) of sodium hydroxide in 60 ml. of water is added to a cooled slurry of 173 grams (1.2 moles) of β-dimethylaminoethyl chloride hydrochloride in 200 ml. of toluene. After some ten minutes' stirring, all of the salt has decomposed, and the toluene solution is decanted. The aqueous sludge that remains is extracted in a similar manner with five 80 ml. portions of fresh toluene. The toluene decantates are combined and dried over anhydrous potassium carbonate for two hours. The potassium carbonate is then removed by filtration. Heating of the sodium 4-chloro-2-benzylphenoxide solution is discontinued, the Dean-Stark trap replaced by an ordinary reflux condenser, and the toluene solution of β-dimethylaminoethyl chloride is added thereto in a slow stream. Following the addition, heating is resumed, and the reaction mixture stirred and refluxed overnight.

Heating is stopped, and a solution of 240 grams (1.25 moles) of anhydrous citric acid in one liter of water is added cautiously to the reaction mixture. The two clear layers result after thorough mixing. The hot solution is transferred to a separatory funnel and the aqueous layer withdrawn as quickly as possible. Crystallization begins almost at once. The solution is cooled and the crude product collected by filtration. Recrystallization from methanol gives 320 grams of 4-chloro-2-benzylphenyl β-dimethylaminoethyl ether dihydrogen citrate; M. P. 141.5–143.5° C.

Analysis:

|   | Calcd. for $C_{23}H_{28}O_8NCl$ | Found |
|---|---|---|
| C | 57.3 | 57.5 |
| H | 5.9 | 5.8 |

EXAMPLE XXIV 2-benzylphenyl β-dimethylaminoethyl ether dihydrogen citrate

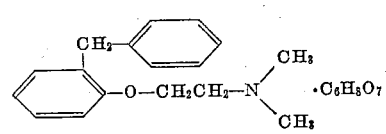

To a well-stirred solution of 184 grams (1.0 mole) of a mixture of approximately equal amounts of 2-benzylphenol and 4-benzylphenol in 650 ml. of toluene is added 46 grams (1.15 moles) of flake sodium hydroxide. The mixture is boiled under reflux until 18 ml. of water has been removed by means of a Dean-Stark trap. Approximately two hours are required to completely remove the water. If desired, the water may be removed by azeotropic distillation with the toluene, provided the toluene thus lost is replaced. The mixture is filtered through a fritted glass funnel of coarse porosity while still hot in order to remove the insoluble sodium 4-benzylphenoxide. Acidification of the sodium 4-benzylphenoxide gives crude 4-benzylphenol, which may be recovered as a by-product.

A suspension of 86.5 grams (0.6 mole) of β-dimethylaminoethyl chloride hydrochloride in 100 ml. of toluene is cooled in a beaker and a solution of 30 grams (0.75 mole) of sodium hydroxide in 30 ml. of water is added in one portion. The mixture is stirred until all of the salt has decomposed to form a homogeneous paste on the bottom of the beaker. The toluene solution of the basic chloride is removed by decantation. The aqueous paste is extracted by decantation with five 40 ml. portions of toluene. The combined extracts are dried over anhydrous potassium carbonate for at least two hours.

The dark brown toluene solution of sodium 2-benzylphenoxide is placed in a three-necked flask equipped with a mechanical stirrer and a reflux condenser. The toluene solution of the β-dimethylaminoethyl chloride is filtered and added to the flask in one portion. The stirred mixture is refluxed overnight. To the stirred reaction mixture is added a solution of 135 grams (0.7 mole) of anhydrous citric acid in 350 ml. of water. Heat is evolved and the dihydrogen citrate begins to precipitate in a short time. The mixture is cooled and the crude salt collected by filtration. It may be recrystallized from either water or methanol. One recrystallization from water gives 158 grams of 2-benzylphenyl β-dimethylaminoethyl ether dihydrogen citrate; M. P. 138.5–139.5° C.

Analysis:

| | Calcd. for $C_{23}H_{29}O_8N$ | Found |
|---|---|---|
| C | 61.8 | 62.1 |
| H | 6.5 | 6.6 |

We claim:
1. A process for the preparation of a compound having the formula

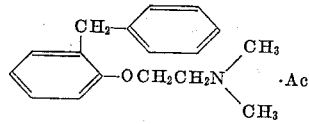

wherein Ac represents citric acid which comprises dissolving a mixture of ortho-benzylphenol and para-benzylphenol in an inert non-aqueous organic solvent; reacting said mixture with an alkali metal hydroxide to prepare the corresponding alkali metal salt; removing the relatively insoluble alkali metal salt of para-benzylphenol; heating said solution of the alkali metal salt of ortho-benzylphenol in said inert non-aqueous organic solvent with β-dimethylaminoethyl chloride hydrochloride in the presence of a member selected from the group consisting of alkali metal hydroxides and carbonates until the formation of the phenolic basic ether is substantially completed; adding citric acid and water to the hot mixture; and separating and cooling the aqueous phase to precipitate 2-benzylphenyl β-dimethylaminoethyl ether dihydrogen citrate.

2. A process according to claim 1, wherein the alkali metal salt is the sodium salt.

References Cited in the file of this patent
UNITED STATES PATENTS

| 1,894,865 | Hartmann et al. | Jan. 17, 1933 |
| 2,016,848 | Akimoff et al. | Oct. 8, 1935 |
| 2,427,878 | Rieveschl et al. | Sept. 23, 1947 |